United States Patent
Børnes et al.

(10) Patent No.: US 7,992,632 B2
(45) Date of Patent: Aug. 9, 2011

(54) SYSTEM FOR POWER SUPPLY TO SUBSEA INSTALLATIONS

(75) Inventors: Atle Harald Børnes, Fyllingsdalen (NO); Rune Mode Ramberg, Sandnes (NO)

(73) Assignee: Statoil ASA, Stavanger (NO)

( * ) Notice: Subject to any disclaimer, the term of this patent is extended or adjusted under 35 U.S.C. 154(b) by 32 days.

(21) Appl. No.: 11/813,847

(22) PCT Filed: Dec. 23, 2005

(86) PCT No.: PCT/NO2005/000480
§ 371 (c)(1),
(2), (4) Date: Sep. 17, 2007

(87) PCT Pub. No.: WO2006/075913
PCT Pub. Date: Jul. 20, 2006

(65) Prior Publication Data
US 2008/0236810 A1 Oct. 2, 2008

(30) Foreign Application Priority Data
Jan. 13, 2005 (NO) .................................. 20050188

(51) Int. Cl.
*E21B 43/24* (2006.01)
(52) U.S. Cl. ........ 166/61; 166/338; 166/272.1; 166/302
(58) Field of Classification Search .............. 166/338, 166/272.1, 302, 57, 60, 61
See application file for complete search history.

(56) References Cited

U.S. PATENT DOCUMENTS

| 3,782,465 A | * | 1/1974 | Bell et al. ..................... 166/248 |
| 4,319,632 A | * | 3/1982 | Marr, Jr. ......................... 166/60 |
| 4,366,356 A | * | 12/1982 | Ando .............................. 219/629 |
| 4,589,492 A | * | 5/1986 | Greiner et al. ................ 166/338 |
| 4,945,334 A | * | 7/1990 | Biersach ..................... 340/388.2 |

(Continued)

FOREIGN PATENT DOCUMENTS

GB 2 331 535 A 5/1999

(Continued)

OTHER PUBLICATIONS

Urdahl et al., "Operational Experience by Applying Direct Electrical Heating for Hydrate Prevention," OTC 15189, Offshore Technology Conference, May 2003, pp. 1-7.

(Continued)

*Primary Examiner* — Thomas A Beach
*Assistant Examiner* — Matthew R Buck
(74) *Attorney, Agent, or Firm* — Foley & Lardner LLP

(57) ABSTRACT

A system for power supply to subsea installations and plants for production of hydrocarbons, comprising a preferably heat insulated pipeline (10), in which the possibility for internal formation of detrimental hydrates or wax deposits are present, and comprising electrical power supply cables (12, 31) for direct electrical heating of the pipeline (10), and having an electrical connection (36) to the surrounding sea at an end of the supply cable. The power supply cable (12) is further configured, in a second circuit configuration, to provide a three-phase power supply to an electrically powered motor in an subsea installation unit (11) connected to the pipeline (10), and that means (18, 19) are arranged for switching so that the three conductors (28) forming the power supply cables (12) form parallel conductors in a second circuit configuration, wherein the power supply cables (12, 31) supply power for direct heating of the pipeline (10).

19 Claims, 2 Drawing Sheets

U.S. PATENT DOCUMENTS

| | | | |
|---|---|---|---|
| 6,006,837 A * | 12/1999 | Breit | 166/302 |
| 6,142,707 A | 11/2000 | Bass et al. | |
| 6,260,615 B1 * | 7/2001 | Dalrymple et al. | 166/60 |
| 6,318,467 B1 * | 11/2001 | Liu et al. | 166/302 |
| 6,328,583 B2 * | 12/2001 | Ness et al. | 439/193 |
| 6,371,693 B1 * | 4/2002 | Kopp et al. | 405/158 |
| 6,509,557 B1 * | 1/2003 | Bass | 219/772 |
| 6,617,556 B1 * | 9/2003 | Wedel | 219/629 |
| 6,707,012 B2 * | 3/2004 | Stone, Jr. | 219/482 |
| 6,714,018 B2 * | 3/2004 | Bass | 324/525 |
| 7,311,151 B2 * | 12/2007 | Chitwood et al. | 166/367 |
| 2003/0015519 A1 * | 1/2003 | Stone, Jr. | 219/494 |
| 2007/0098375 A1 * | 5/2007 | Kinnari et al. | 392/301 |

FOREIGN PATENT DOCUMENTS

| | | |
|---|---|---|
| GB | 2 437 161 A | 10/2007 |
| GB | 2 457 791 A | 9/2009 |
| WO | WO 03/090499 A1 | 10/2003 |
| WO | WO-2004/111519 | 12/2004 |
| WO | WO 2004111519 A1 * | 12/2004 |
| WO | WO 2010/135772 A1 | 12/2010 |

OTHER PUBLICATIONS

European Patent Office Supplementary European Search Report dated Jan. 20, 2011; 1 page.

* cited by examiner

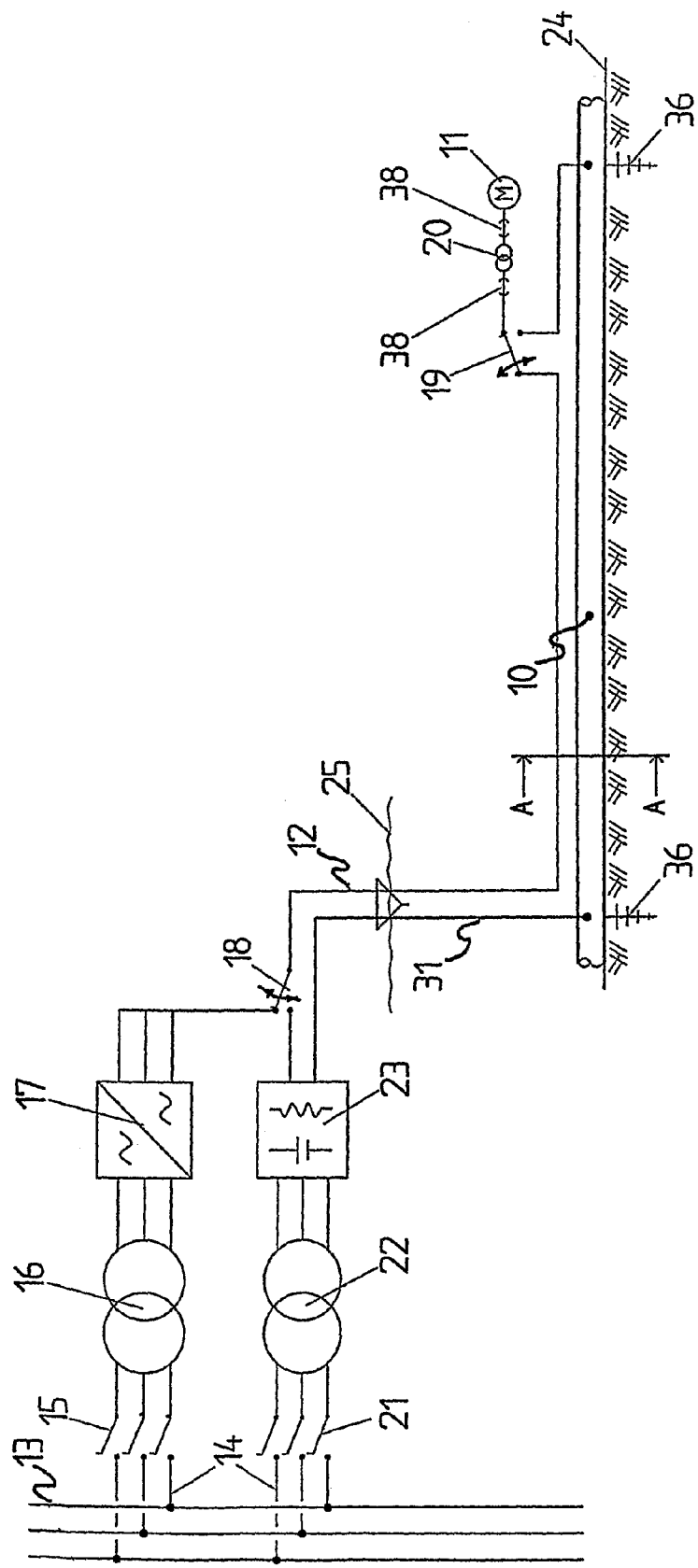
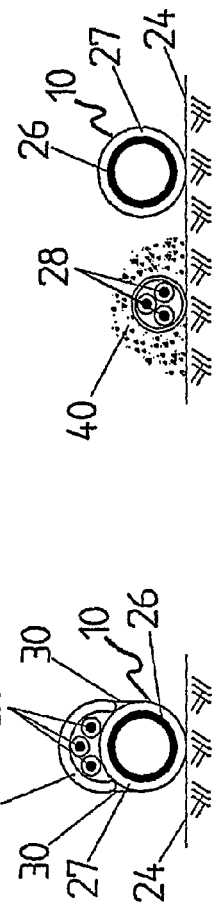
Fig. 2
FIG. 3A.
FIG. 3B

SYSTEM FOR POWER SUPPLY TO SUBSEA INSTALLATIONS

The present invention relates to a system for power supply to subsea installations and plants for exploitation of hydrocarbons. Preferably, the system comprises a thermally insulated pipeline, in which internal formation of detrimental hydrates or build up of wax deposits may occur, and where the power supply cables are connected to each end of the pipeline for direct electrical heating of the pipeline. The pipeline may preferably at the points of cable connection(s) have an electrical connection to the seabed and/or the surrounding seawater.

Offshore hydrocarbon exploitation is performed in deeper and deeper waters and more and more remote from shore. Another development is that satellite wells to increasing degree are used. The satellite wells rest on the sea bed and are operated from a remote platform or other types of facilities, through pipeline systems on the sea bed. Some of these pipelines rest the seabed at large depths, for example deeper than 300 meters, where the temperature of the sea water surrounding the pipeline is in the order of 4° C. Water is produced together with the hydrocarbons and the temperature in the produced hydrocarbons together with the produced water is high when leaving the oil well. When hydrocarbons are transported along the sea bed, the hydrocarbons are cooled down. During such cooling, certain phenomenon occurs, effecting the flow trough the pipeline. Hydrocarbons become viscous and paraffin wax is deposited on the internal pipeline wall when the temperature in the hydrocarbons becomes lower. Gaseous hydrocarbon subjected to pressure combined with the presence of water at low temperatures form a solid material denoted as hydrate. Hydrates can plug the pipeline and such plugs are often difficult to remove. In deeper waters it is experienced that conventional methods for pressure relieving pipelines, in order to remove hydrate plugs, are not effective. High pressure in the pipeline and uneven sea bed topography require much time and may cause several operational problems and being expensive due to lost production time.

The problem related to low temperatures in submerged pipelines has previously been solved by placing thermal insulation around the pipeline. For a number of pipelines, however, such thermal insulation is ineffective because of the length of the pipelines. Increased flow rates through the pipelines contribute to minimize the fall in temperature in the fluid and is also affecting other factors. The problems related to loss of heat from a pipeline increases at tail production from an oil reservoir, since the production rate often falls at such phase of the well lifetime. The problems are particularly large when the pipeline has to shut down for an extended period. In particular, this may for example be the case during work on the well or on the facilities receiving the fluids from the pipeline. The cost of thermal insulation in order to prevent cooling down of the pipeline may be prohibitive under such conditions.

Generally, the development is going towards placing more of the equipment previously placed on a platform deck (topside) or on a plant onshore, on the sea bed. Water injection motors are one of the installations preferred to be installed on the sea bed in connection with a template. The water injection pump is intended to function as a pressure support for the wells. The purpose of placing a water injection motor on the sea bed is to avoid transportation of produced water to the topside and the back to and down again into the reservoir. Consequently, it is possible to reduce both the dimensions and the number of the pipelines.

Direct electrical heating (DEH) of the pipelines for prevention of formation of hydrates is inter alia known from the OTC-paper, OTC 15189, presented at the Offshore Technology Conference in Houston, USA in 2003. DEH is based on the basic principle of applying electrical alternating current to a metallic conductor in order to generate heat. In a DEH system the pipe to be heated is an active conductor of current in a single-phase circuit, formed by the power supply cables and the pipe itself. Since the pipe is electrically connected to sea (earth potential) at both ends, it is important for the efficiency of the system that the power supply cables are arranged close to the pipe. The potential in the cable decreases from full potential at the platform topside to zero potential at the connection points at the sea bed.

Further, it is known to arrange the water injection motor and the pump on the sea bed on the template for pumping produced water back into the reservoir. Such water injection motor requires a three-phase power supply and as symmetrical cable configuration as possible. The power is delivered from a platform.

The object of the invention is to provide a solution combining these two independent functions in order to simplify construction of the supply net for electrical energy and the pipeline.

The object of the invention is achieved by applying a system as further described in the attached claims.

The present invention relates to a method of combining the cable systems for supply of power to the two different systems by a switching configuration solution, making it possible to switch between a single phase configuration for DEH and a three-phase configuration for a motor for a water injection pump. The solution meets the specific requirements required for DEH, both from a configuration aspect and from a cable design point of view, in that the planned DEH cable is either split into three parallel cables, or three conductors covered by a common cable coating. The cable is mechanically protected by means of a protective profile or by a protective layer of gravel or a back-filled trench in the seabed. The proposed solution will represent great savings in view of more effective installation and the reduced lengths of cables necessary.

From an operational aspect the water injection pump will normally be in continuous operational mode during production of hydrocarbons, while DEH in principle only is used during shut-down and stop in production of the hydrocarbons. Hence, the two systems will be mutually dependent. Since the time constant for the water injection system is large, it is considered acceptable not to operate the water injection pump while electrical heating of the pipeline is in progress.

In the following, the invention shall be described in further details, referring to the drawings, where:

FIG. 2 shows schematically a circuit diagram for the principles use according to the present invention;

FIG. 3a shows schematically a section through a pipeline with the cable, covered by a protective means on the pipeline, seen along the lone A-A in FIG. 1; and FIG. 3b shows schematically a section through the pipeline with the cable arranged along one side of the pipeline and protected by a protective layer of soil or gravel.

Figure 1:
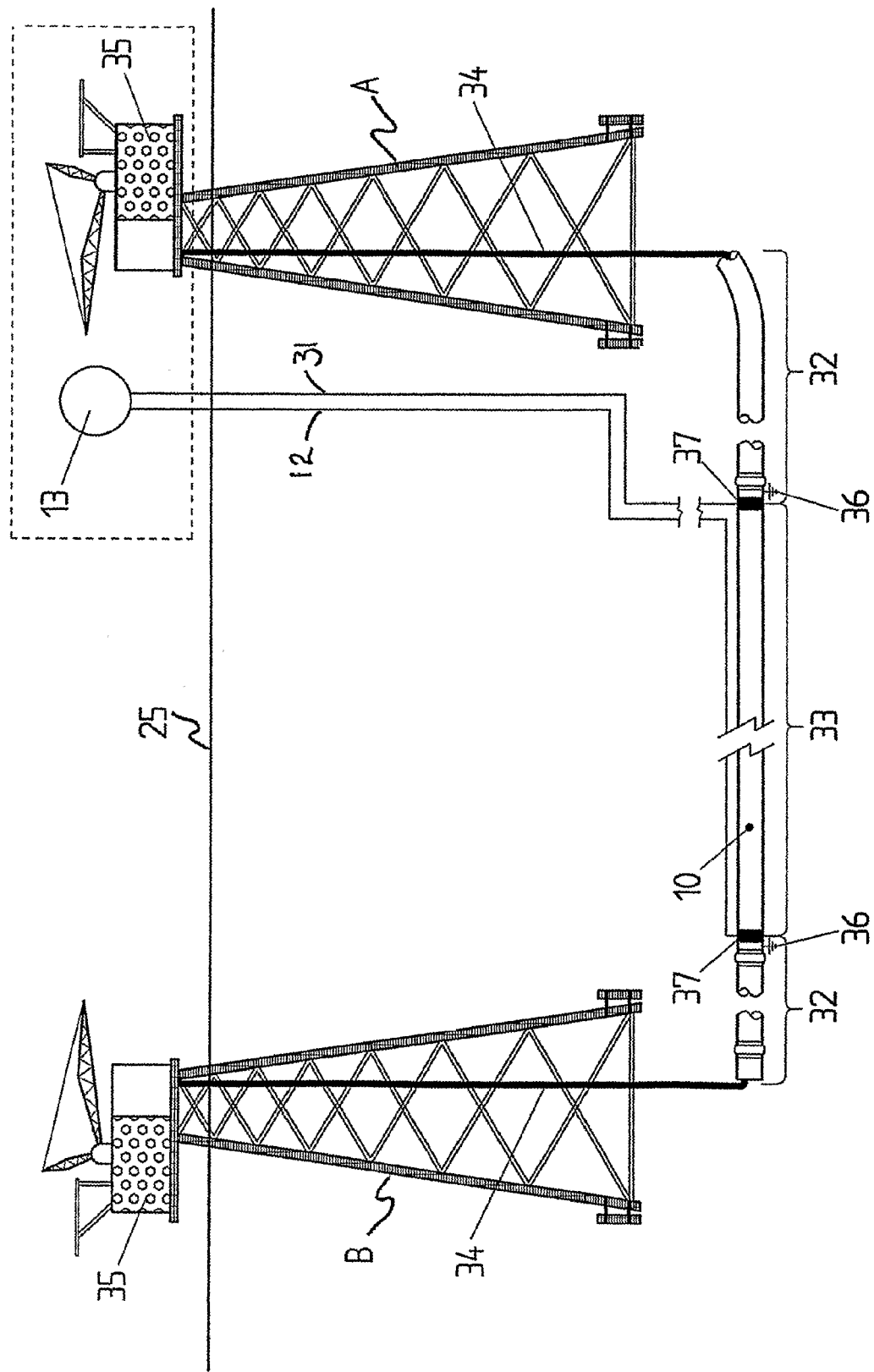
FIG. 1 shows schematically a prior art field infrastructure provided with a DEH system for direct electrical heating of a pipeline transporting oil, the pipeline extending between two platforms.

FIG. 1 shows schematically a conventional field development comprising two platforms A,B, wherein a pipeline 10 is arranged on the sea bed, extending between the two platforms A,B. As indicated in the Figure the part of the pipeline resting on the sea bed is configured with an end zone 32 at each end, and an intermediate pipeline section 33 to be heated. A riser 34 extends vertically up from the sea bed at each end zone 32 to the decks 35 of the platforms A,B. High voltage current is delivered from a power supply means 13 on one of the platform decks through a power supply cable 12 and a return cable 31. For this purpose, each end of the pipeline 10 on the sea bed is provided with a cable connection point 37. The pipeline 10 on the sea bed is in the region of each connection point earthed to the sea bed and/or the surrounding sea water by means of a suitable earth connection 36.

FIG. 2 shows schematically the principle applied in the present invention. A pipeline 10 transports hydro-carbons from an installation (not shown) on a sea bed 24, such as a template, to for example a platform facility or the like (not shown) above the sea level 25. A water injection motor 11 is arranged on the template, the motor 11 driving a pump (not shown) for injecting water down into the seabed formations 24. The purpose of the water injection motor 11 and the pump is to pump produced water directly back into the reservoir without first having to pump the water up to the platform deck 35 and back down into the reservoir.

The water injection motor 11 has a three-phase power supply, the power being delivered for example from the platform 35 through a power supply line(s) 12. Power is delivered from a three-phase power supply 13 via a circuit 14. Said circuit 14 is configured with circuit breakers 15 and possibly a transformer 16, and possibly also a frequency converter 17. Further, down line of the frequency converter, a no load switch 18 may also be installed, preferably avoiding presence of voltage potential during switching.

The purpose of the frequency converter 17 is to be in position to regulate the frequencies of the supplied power and consequently the speed of the motor/pump. Normally such frequencies vary between 0 Hz and 60 Hz.

The power supply lines 12 comprise three separated, insulated cables 28. The cables 28 are preferably configured trifoiled on the pipeline 10 in order to obtain as even loading of the motor 11 and the three cables 28 as possible. Alternatively, the cables 28 may be laid alongside the pipeline 10, the cables 28 being protected separately by soil or gravel 40. If the cables 28 are not configured symmetrically, problems may occur when starting the motor 11.

In the circuit configurations a subsea switch 19 is incorporated, the switch preferably being of a no load type, avoiding exposure of potential during the switching operation from direct electrical heating to operation of the water injection motor 11. A transformer 20 may optionally be included in the circuit between the subsea switch 19 and the water injection motor 11. Connectors 38 may also be incorporated in this circuit configuration.

In the circuit configuration for single-phase power a three-phase power supply source 13 and switches 21 are included. Further, a symmetry and power factor compensation unit 23, and possibly a transformer 22 are incorporated into the circuit. In stead of a symmetry and power factor compensation unit 22, as shown in FIG. 2, frequency converter (not shown) may be incorporated. The advantage using a frequency converter is that it becomes easier to regulate the power input to the direct electrical heating system. In the area of the connection points for the power supply lines 12,31, the pipeline is earthed to the sea bed or the surrounding water by means of an earth connection.

FIG. 3a shows a section through the pipeline 10, seen along line A-A in FIG. 2. As indicated in FIG. 3, the pipeline 10 comprises a steel pipe 26 and a heat insulation layer 27 of any suitable and conventional type, arranged around the steel pipe 26. The supply line 12 is formed of three separated power cables 28, insulated from the sea (earth potential). The three power cables 28 are configured in a triangular configuration. The power cables 28 are arranged close to the exterior of the heat insulated pipeline 10 and extend at least along the length of the pipeline intended to be heated. The power cables 28 are physically protected by means of protective profile 29. The purpose of the protective profile 29 is inter alia to protect the power cables 28 against impact and loads caused by trawler boards, fishing gear or dropped objects. The protective profile 29 may have any suitable shape, for example a curved shape. The protective profile 29 is strapped to the pipeline 10 in any suitable manner, for example by means of strapping tapes 30.

FIG. 3b shows corresponding cables 28 placed alongside the pipeline 10 on the seabed and covered by a protective layer of seabed soil or gravel 40.

The solution according to the invention functions in the following manner:

When the pipeline is to be heated in order to prevent formation of hydrate or wax plugs, the voltage is removed from the no load switches 18 and 19 by switching off the circuit breakers 15,21. Thereupon the no load switches 18, 19 are switched to a position where high voltage single phase current may be conducted from the high voltage source 13 to the pipe 10. Thereupon the no load switch 21 is connected in again whereby high voltage single phase current is conducted through the cable configuration. The water injection pump is now disconnected. The high voltage cables 12,31 are each connect to the appropriate end of the pipeline 10 and thus closing an electrical circuit together with the pipeline 10. When the possibility of formation of hydrate is imminent, the DEH system is switched on. This may for example be the case when production of hydrocarbons for reason or another has stopped and the content in the pipeline 10 is cooling down because of the surrounding temperature being lower, for example in the order of 4° C. The system for direct electrical heating is earthed to the sea water, for example by means of anodes (not shown) attached to the external wall of the pipeline 10 at each end. This is done from a safety point of view and in order to obtain a solution which is robust towards damages to the exterior coating of the pipeline 10, even if it may lead to parts of the current being conducted through the sea water, thus requiring more energy.

According to this solution, the steel pipe 26 is heated up by electrical alternating current producing heat by flowing through the steel pipe 26. By adequate dimensioning it is feasible to maintain a temperature in the condensate/water mixture in the pipeline 10 in excess of 25° C. in the heated part of the pipeline 10 during shutdown. The three conductors 28 will in such case be coupled in parallel.

At restart of production in the well, the circuit breakers 15,21 are shut off again, whereupon the no load switches 18,19 are switched on, whereby the water injection motor 1 starts running. When switching on the circuit breakers 15,11 the motor is powered by high voltage three phase current delivered by the high voltage power supply, and produced water is injected back into the reservoir. For such configuration the pipeline 10 will not be heated to any significant extent in excess of the heating caused by the transport of hot hydrocarbons through the pipeline 10.

It should be appreciated that the cables preferably should not be reinforced since such reinforcement may jeopardize the function of the system. If the cables 28 contain metallic reinforcement, it may induce large currents in the reinforcement. This may cause superheat in the cables 28, while the pipe 10 at the same time will not be heated as intended.

Although it is specified that connectors 38 may be used, it should be appreciated that this is not an absolute requirement.

The purpose of using connectors is to make subsea installation easier. In such solution, both ends may be submerged on to the seabed and connected at a later stage. There is no dependency of using such method for connecting the cables, as the connection may performed above sea level by means of a cable joint.

It should further be appreciated that even if a no load switch 19 is specified, the invention is not limited to use of such switch. A no load switch 19 is a simplified solution in that the component does not have to designed for switching full load and potential fault current. For subsea equipment it is a preference to make these switches 19 as simple and failure safe as possible. It is such requirement that governs the choice of a no load switch 19.

The cable 28 may possibly, but not necessary, be provided with an outer coating of a semi-conductor type. Use of such semi-conductor type may be a simple manner to avoid high voltage in the shield for long lengths of cables, in that charging current is drained radially out in the entire length of the cable. Hence, longitudinal screen current and thus induced screen voltage is avoided. Short length of cables may preferably be provided with an insulated external coating.

The invention claimed is:

1. A system for power supply to subsea installations and plants for production of hydrocarbons, comprising a pipeline, wherein the possibility for internal formation of detrimental hydrates or wax deposits is present, and comprising electrical power supply cables connected to each end of the pipeline and configured to directly electrically heat the pipeline through application of alternating current to the pipeline by means of cable connectors having an electrical connection to the surrounding sea in a first circuit configuration, wherein the power supply cables are further configured to, in a second circuit configuration, provide a three phase power supply to an electrically powered motor in a subsea installation unit connected to the pipeline, and that means are arranged for switching so that three conductors forming the power supply cables form parallel conductors in the first circuit configuration, and wherein only a single power source is used to supply power to directly electrically heat the pipeline and to power the electrically powered motor.

2. A system for power supply according to claim 1, wherein the first circuit configuration is a single phase configuration, and wherein the second circuit configuration is a three phase configuration.

3. A system for power supply according to claim 2, wherein the means for switching comprises subsea switches which are designed to operate at no load.

4. A system for power supply according to claim 3, wherein the means for switching also comprises a switch which is designed to operate at no load.

5. A system for power supply according to claim 1, wherein the second circuit configuration comprises a transformer and also a frequency converter.

6. A system for power supply according to claim 1, wherein the first circuit configuration comprises a symmetry and power factor compensation unit.

7. A system for power supply according to claim 1, wherein the first circuit configuration comprises a frequency converter.

8. A system for power supply according to claim 1, wherein the second circuit configuration comprises a frequency converter.

9. A system for power supply according to claim 8, wherein the frequency converter is designed to vary the frequency in the range of 0 Hz and 60 Hz.

10. A system for power supply according to claim 1, wherein the cables are arranged externally on the pipeline and covered by a protective profile fixed to the pipeline.

11. A system for power supply according to claim 1, wherein the cables are placed alongside the pipeline and covered by a layer of protective masses.

12. A system for power supply according claim 1, wherein the first or second circuit configuration comprises a transformer.

13. A system for power supply according to claim 10, wherein the cables are fixed to the pipeline by straps.

14. A system for power supply according to claim 1, wherein the cables are placed alongside the pipeline and are covered by a layer of protective masses, wherein the layer of protective masses includes at least one of seabed masses or gravel.

15. A system for power supply according to claim 1, wherein the pipeline is heat insulated.

16. A system for power supply to subsea installations and plants for production of hydrocarbons, comprising:
 a heat insulated metal pipeline wherein the possibility for internal formation of detrimental hydrates or wax deposits is present; and
 an electrical power supply cable assembly including electrical power supply cables connected to the proximate ends of the pipeline and configured to directly electrically heat the pipeline through application of alternating current to the pipeline by cable connectors having an electrical connection to the surrounding sea in a first circuit configuration,
 wherein the power supply cable assembly is configured to, in a second circuit configuration, provide a three phase power supply to an electrically powered motor in an installation unit located below a surface of a sea that is connected to the pipeline, and a switching assembly is arranged so that conductors forming the power supply cables form parallel conductors in the first circuit configuration, and wherein only a single power source is used to supply power to directly electrically heat the pipeline and to power the electrically powered motor.

17. A system for power supply according to claim 16, wherein at least one of the power supply cables is arranged away from the pipeline with empty space between the outer surface of the at least one power supply cable and the outer surface of the pipeline.

18. A system for power supply according to claim 16, wherein the electrically powered motor is installed proximate a sea bed below a surface of a sea.

19. A system for power supply according to claim 16, wherein the second circuit configuration comprises a transformer and also a frequency converter.

* * * * *